(12) United States Patent
Yang

(10) Patent No.: US 10,895,468 B2
(45) Date of Patent: Jan. 19, 2021

(54) DYNAMIC LANE-LEVEL VEHICLE NAVIGATION WITH LANE GROUP IDENTIFICATION

(71) Applicant: TOYOTA JIDOSHA KABUSHIKI KAISHA, Toyota (JP)

(72) Inventor: Hao Yang, Mountain View, CA (US)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 144 days.

(21) Appl. No.: 15/950,035

(22) Filed: Apr. 10, 2018

(65) Prior Publication Data

US 2019/0310100 A1  Oct. 10, 2019

(51) Int. Cl.
| | |
|---|---|
| G01C 21/36 | (2006.01) |
| G01C 21/34 | (2006.01) |
| G08G 1/01 | (2006.01) |
| G08G 1/052 | (2006.01) |

(52) U.S. Cl.
CPC ..... G01C 21/3658 (2013.01); G01C 21/3446 (2013.01); G01C 21/3461 (2013.01); G01C 21/3492 (2013.01); G08G 1/0129 (2013.01); G08G 1/0137 (2013.01); G08G 1/052 (2013.01)

(58) Field of Classification Search
None
See application file for complete search history.

(56) References Cited

U.S. PATENT DOCUMENTS

| | | | |
|---|---|---|---|
| 8,452,771 B2 | 5/2013 | Kurciska et al. | |
| 9,656,673 B2 | 5/2017 | Clarke et al. | |
| 9,846,050 B2 * | 12/2017 | Myers | B60Q 1/085 |
| 9,933,272 B2 * | 4/2018 | Woolley | G01C 21/3658 |

(Continued)

FOREIGN PATENT DOCUMENTS

| | | |
|---|---|---|
| JP | 2007071579 A | 3/2007 |
| JP | 2008151752 A | 7/2008 |
| JP | 2011237329 A | 11/2011 |

OTHER PUBLICATIONS

Rabe et al., "Ego-lane estimation for lane-level navigation in urban scenarios," 2016 IEEE Intelligent Vehicles Symposiums (IV), Jun. 19, 2016 (6 pages).

(Continued)

*Primary Examiner* — Dale W Hilgendorf
*Assistant Examiner* — Alexander C. Bost
(74) *Attorney, Agent, or Firm* — VLP Law Group LLP; Michel Bohn

(57) ABSTRACT

The disclosure includes a system and method for dynamic vehicle navigation with lane group identification. The system includes one or more processors configured to identify a plurality of roadway lanes on a plurality of roads, determine a plurality of lane groups in the plurality of roadway lanes based on traffic data indicating traffic on the plurality of roadway lanes, and estimate lane-group level traffic of the plurality of lane groups based on the traffic on the plurality of roadway lanes. The processors may further identify a client device location of a client device and a destination location, optimize a route between the client device location and the destination location using the plurality of roads and based on the lane-group level traffic of the plurality of lane groups, and provide route guidance to the client device based on the optimized route.

16 Claims, 7 Drawing Sheets

(56) References Cited

U.S. PATENT DOCUMENTS

| | | | |
|---|---|---|---|
| 9,964,414 B2 | 5/2018 | Slavin et al. | |
| 10,354,526 B2* | 7/2019 | Jang | G08G 1/0129 |
| 2013/0184926 A1* | 7/2013 | Spero | B62D 1/28 |
| | | | 701/26 |
| 2014/0195138 A1* | 7/2014 | Stelzig | G08G 1/0116 |
| | | | 701/119 |
| 2014/0207325 A1* | 7/2014 | Mudalige | B62D 15/025 |
| | | | 701/26 |
| 2014/0278052 A1 | 9/2014 | Slavin et al. | |
| 2015/0170514 A1* | 6/2015 | Stenneth | G08G 1/0125 |
| | | | 701/117 |
| 2015/0312327 A1* | 10/2015 | Fowe | G06K 9/00785 |
| | | | 701/23 |
| 2016/0046290 A1* | 2/2016 | Aharony | G06K 9/00798 |
| | | | 701/41 |
| 2017/0084178 A1* | 3/2017 | Jain | G05D 1/0212 |
| 2017/0089717 A1* | 3/2017 | White | G01C 21/3658 |
| 2018/0182238 A1* | 6/2018 | Fowe | G08G 1/0129 |
| 2018/0297596 A1* | 10/2018 | Li | G01C 21/3407 |
| 2019/0061765 A1* | 2/2019 | Marden | G05D 1/0214 |
| 2019/0079524 A1* | 3/2019 | Zhu | G05D 1/0212 |
| 2019/0301872 A1* | 10/2019 | Jin | G01C 21/32 |
| 2019/0329783 A1* | 10/2019 | Shalev-Shwartz | |
| | | | G01C 21/3602 |

OTHER PUBLICATIONS

Tian, "Connectivity Based Optimal Lane Selection Assistance System," Cal Poly Pomona 2nd Annual Creative Activities & Research Symposium, Aug. 17, 2016 (22 pages).

* cited by examiner

DYNAMIC LANE-LEVEL VEHICLE NAVIGATION WITH LANE GROUP IDENTIFICATION

BACKGROUND

The present disclosure relates to a navigation system for estimating journey route travel times. In particular, the specification relates to a navigation system that increases accuracy of estimated travel times using traffic for groups of lanes.

Users are increasingly relying on navigational systems on computing devices to provide useful information during travelling. However, existing systems generally only take into consideration averages of routes or roads and generally not take into consideration lane level navigation or traffic.

In some roadway networks, due to vehicle demands for various origin and destination point pairs and traffic signals spread across entire networks, traffic conditions, such as vehicle queues, vehicle delays and average speed, at different lanes can be very different even in the same road segment. However, current navigations systems fail to sufficiently address these variations.

Some existing navigation systems use lane selections. For instance, some such navigation systems are described in Rabe, J., Necker, M., and Stiller, C., "Eco-lane estimation for lane-level navigation in urban scenarios," *IEEE Intelligent Vehicles Symposium*, pp. 896-901, 2016, and U.S. Pat. No. 9,656,673. However, these existing systems merely consider helping a driver enter a route efficiency rather than, for instance, using lane-level data to generate the routes.

One patent publication describing vehicle navigation is 20140278052 A1 (052). '052 uses a roadway-level optimizer and lane-level optimizer. '052 applies a microscopic traffic simulation to model individual vehicles in traffic streams and capture lane-level traffic conditions. '052 applies the microscopic traffic simulation to predict traffic conditions based on real-time traffic conditions, utilizes the simulated road-level travel times to determine candidate paths for target vehicles, and then searches for recommended lanes along the candidate paths. However, because lane-level traffic conditions are estimated through a microscopic simulation, real-world driving behaviors are not accurately represented and the operations are not scalable to real-world roadway networks.

Further, '052 searches for vehicle routes and lanes based on traffic conditions without considering lane groups, which results in excessive lane changing behaviors. Such extra lane changes not only increase the potential risk of accidents, but also generate additional road congestion and reduce the efficiency of networks and vehicles. Moreover, frequent lane changes can reduce the driving comfort during trips.

Another navigation system is described in Tian, D. and Wu, G., "Connectivity based optimal lane selection assistance systems," *CPP Creative Activities and Research Symposium*, California State Polytechnic University, Pomona, 2016 (Tian). Tian develops a lane selection assistance system to help drivers to search for optimal lane-level routes to decrease their travel times. Tian predicts lane-level traffic states to plan the optimal routes and lanes for individual vehicles. However, the prediction method of Tian is only applicable to uninterrupted freeway segments that are not extendable to arterial roadway networks thereby limiting the method from being broadly applied in a real-world navigation system. In addition, due to the method's simplicity, it cannot capture distinct individual vehicle behaviors at restricted freeway sections, such as merging lanes. Further, Tian does not consider lane groups, thereby leading to the same unnecessary lane changes as described in reference to '052 above.

Accordingly, simply using traffic data on a lane-level is not sufficient for efficiently navigating using a lane level guidance.

It is desirable to address the limitations of the foregoing approaches.

SUMMARY

The system overcomes the deficiencies of the prior art with technology that provides vehicle navigation using lane group identification. In one implementation, the system includes software, firmware, hardware, or a combination of them installed on the system that in operation causes or cause the system to perform operations, for instance, using a processor, non-transitory storage device, and instructions executed by the processor. According to some implementations, the operations include identifying, by a processor, a plurality of roadway lanes on a plurality of roads; determining, by the processor, a plurality of lane groups in the plurality of roadway lanes based on traffic data indicating traffic on the plurality of roadway lanes; estimating, by the processor, lane-group level traffic of the plurality of lane groups based on the traffic on the plurality of roadway lanes; identifying, by the processor, a client device location of a client device and a destination location; optimizing, by the processor, a route between the client device location and the destination location using the plurality of roads and based on the lane-group level traffic of the plurality of lane groups; and providing, by the processor, route guidance to the client device based on the optimized route.

Implementations may include one or more of the following features: The computer-implemented method where the plurality of lane groups in the plurality of roadway lanes include one or more static lane groups and one or more temporary lane groups. The computer-implemented method where determining the plurality of lane groups in the plurality of roadway lanes includes determining the one or more static lane groups in the plurality of roadway lanes based on a lane-level average speed among adjacent lanes of the plurality of roadway lanes. The computer-implemented method where determining the plurality of lane groups in the plurality of roadway lanes includes determining the one or more temporary lane groups in the plurality of roadway lanes based on a variation in lane-level traffic conditions and a lane-level average speed among adjacent lanes of the plurality of roadway lanes. The computer-implemented method where estimating the lane-group level traffic of the plurality of lane groups includes estimating a current lane-level travel time of the plurality of roadway lanes using a real-time lane-level average speed and a length of a roadway, the lane-group level traffic being based on the current lane-level travel time. The computer-implemented method where estimating the lane-group level traffic of the plurality of lane groups includes combining lane-level information in a particular lane group of the plurality of lane groups to determine the lane-group level traffic, the lane-level information including the current lane-level travel time and a predicted lane-level travel time. The computer-implemented method where estimating the lane-group level traffic of the plurality of lane groups includes applying, by the processor, historical lane-level traffic information to a machine learning algorithm to generate a predictive model, and inputting, by the processor, the current lane-level travel time as an initial state in the predictive model to determine the predicated lane-level travel time. The computer-implemented method where optimizing the route between the client device location and the destination location includes determining the route between the client device location and the destination location by combining at least two of the plurality of lane groups to create a path between the client device location and the destination location. The computer-implemented method where the optimized route includes a lane-level routing indicating a use of which lanes reduces total travel time of the route. The computer-implemented method where optimizing the route between the client device location and the destination location includes generating the lane-level routing based on real-time group travel time and a predicted group travel time.

This document discloses innovative technology for addressing the problems in the Background. Some implementations of the technology can allow increased accuracy by considering real-time and historical traffic on a lane-level, while also increasing vehicle and network efficiency by reducing unnecessary lane changes. These and other benefits are described in further detail below.

BRIEF DESCRIPTION OF THE DRAWINGS

The invention is illustrated by way of example, and not by way of limitation in the figures of the accompanying drawings in which like reference numerals are used to refer to similar elements.

DESCRIPTION

Figure 1:
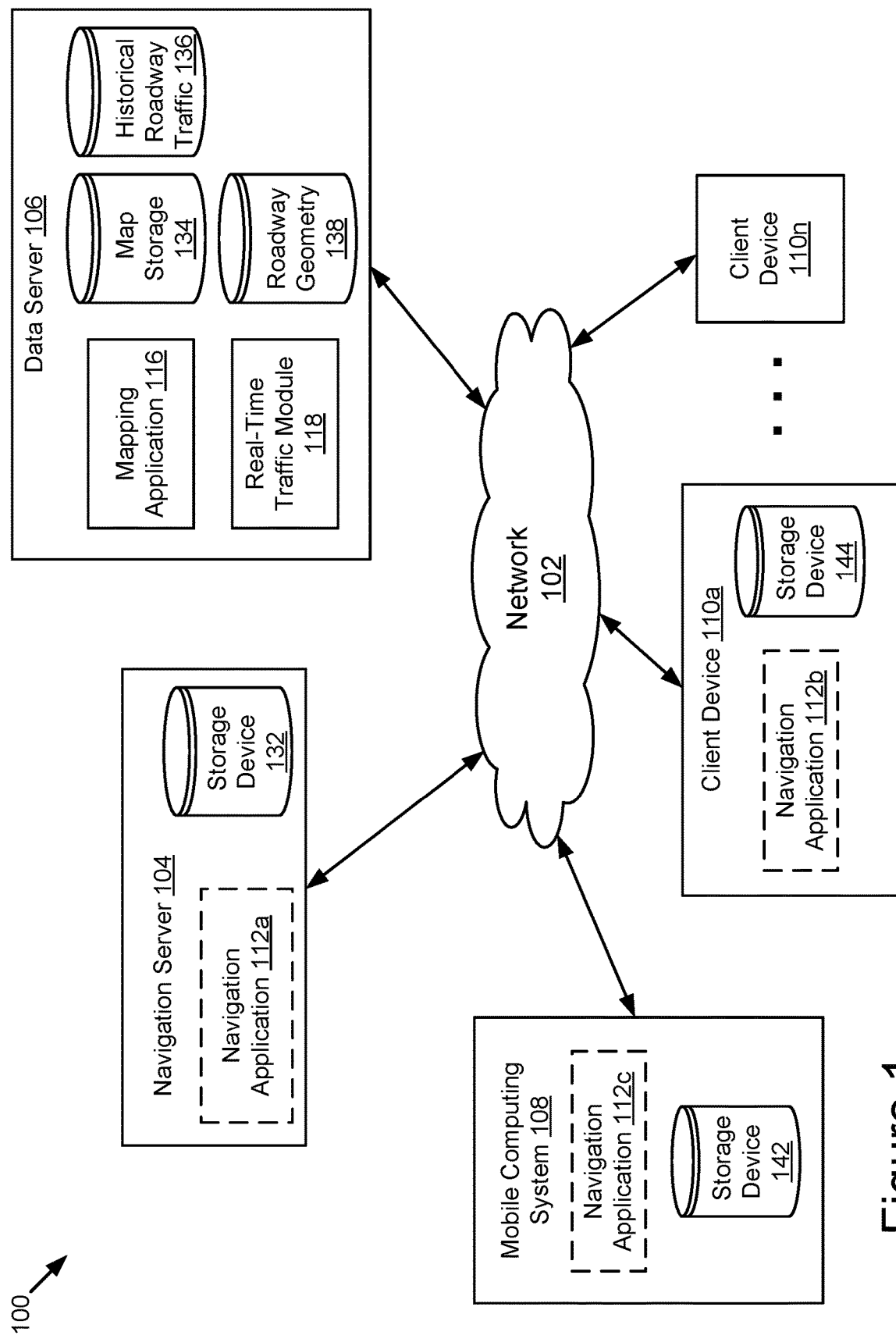
FIG. 1 is a block diagram illustrating an example dynamic vehicle navigation system with lane group identification.

Technology for generating navigation routes using roadway junction impact are described below. The technology develops a dynamic vehicle navigation system to assist individual vehicles, for instance, by providing optimal routes and lanes to navigate from an origin location to a destination location with minimal travel delays and a high level of certainty in travel and arrival times. In some implementations, the technology identifies groups of lanes and searches for a path of roadway segments (e.g., on a lane or lane group level) and lanes associates with each roadway segment for individual vehicles in order to minimize roadway network level congestion and/or the impact of congestion on the individual vehicles.

Some implementations of the technology applies lane-group (i.e., a group of lanes) level information to determine optimal (e.g., having a lowest likely amount of traffic) routes and lanes in the routes. For example, the technology may identify groups of lanes, estimate traffic in the groups, and generate or otherwise optimize a lane or lane-group level route based on the estimated traffic.

The technology further provides specific solutions to the issues discussed in the Background. For instance, the technology includes a lane-level dynamic navigation system that is capable of recognizing and using different traffic levels and travel times of lanes on the same roadway segment, while improving computational accuracy, reducing the level of uncertainty in estimated routes and travel times, and improving roadway network and individual vehicle efficiency. For instance, implementations of the technology may consider equilibrium of different lanes in the same lane group and introduce a traffic prediction model to estimate lane group travel time. These processes may increase the accuracy of travel time estimation and reduce travel time uncertainty of the route choices for individual vehicles.

Further, compared with previous navigation systems, the technology described herein prevents unnecessary lane changes so as to minimize the impact of lane changes to other vehicles and reduce risk of vehicle incidents. The management of lane changes, for example, based on lane groups, is also beneficial as it increases the efficiency (computational or otherwise) of the navigating vehicle. For instance, autonomous cars may consume substantial computing resources each time the vehicle changes lanes (e.g., based on automated route guidance), which can decrease vehicle range and reallocate computing resources from other safety based tasks, for instance.

Further, it should be noted that implementations of the technologies described herein may extend to both freeway and arterial roadways and are scalable to large roadway networks and routes with a significant number of roads and turns. For instance, implementations of the technology may capture distinct vehicle behaviors at restricted freeway sections, such as lane-drop bottlenecks, merging lanes, diverging lanes, and weaving sections.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

FIG. 1 is a block diagram illustrating one example implementation of a dynamic vehicle navigation system 100 with lane group identification. The illustrated system 100 includes a navigation server 104, a data server 106, a mobile computing system 108, and a client device 110 communicatively coupled via a network 102, although it should be noted that additional or fewer components may be used.

The navigation application 112 may be operable on one or more of the components 104, 106, 108, and 110 of the system 100. For example, an instance of the navigation application 112a may be operable on the navigation server 104, 112b on the client device 110a . . . 110n, 112c on the mobile computing system 108, or in some instances, the navigation application 112 may be distributed among two or more components of the system 100.

The navigation application 112 may include logic executable to determine routes and performing actions described herein. In some implementations, the navigation application 112 retrieves position data associated with a mobile computing system 108, client device 110, or a user. The navigation application 112 may retrieve information from the navigation server 104 and/or the data server 106 (e.g., the mapping application 116, real-time traffic module 118, etc.) to perform its operations, as described herein. For example, the position data describes a geographical position on a map. Example components of the navigation application 112 are described in further detail with reference to FIG. 2.

The navigation application 112 may determine the optimal routes and lanes to arrive at destinations with a minimal travel delay and low travel time uncertainty. For instance, the navigation application 112 may identify lane groups, search for a path with an optimal list of roads, roadway segments, and/or lanes, and determine optimal lanes associated with each roadway segment for a particular vehicle.

Some implementations of the navigation application 112 dynamically re-route vehicles in networks to avoid congested regions and to assist the network to better utilize road segments. For example, the system 100 may recalculate route and estimated travel time/estimated time of arrival during route guidance to adapt to changing traffic conditions. During these recalculations, the benefits described above are further compounded.

The network 102 may be a conventional type, wired and/or wireless, and may have numerous different configurations including a star configuration, token ring configuration, or other configurations. For example, the network 102 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), vehicular networks, and/or other interconnected data paths across which multiple devices may communicate.

The network 102 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 102 is a wireless network using a connection such as DSRC (Dedicated Short Range Communication), WAVE, 802.11p, a 3G, 4G, 5G+ network, WiFi™, satellite networks, vehicle-to-vehicle (V2V) networks, vehicle-to-infrastructure/infrastructure-to-vehicle (V2I/I2V) networks, or any other wireless networks. Although FIG. 1 illustrates one network 102 coupled to the navigation server 104, the client device(s) 110, the mobile computing system(s) 108, and the data server 106, in practice one or more networks 102 can be connected to these and other entities.

The navigation server 104 can be a hardware or virtual server that includes a processor, a memory and network communication capabilities. In some implementations, the navigation server 104 sends and receives data to and from one or more of the data server 106, the client device 110a . . . 110n, and the mobile computing system 108. The navigation server 104 also includes a storage device 132, which may include data for users, routes (e.g. new routes and historical routes), lanes, lane groups, maps, etc.

In some implementations, the client device 110a . . . 110n sends and receives data to and from one or more of the navigation server 104, the data server 106, or the mobile computing system 108. The client device 110 is a computing device that includes a memory and a processor, for example a laptop computer, a desktop computer, a tablet computer, a mobile telephone, a personal digital assistant, smartwatch, or other computing device. In some implementations, the client device 110a includes a browser for accessing online services (e.g., a navigation server 104) and a storage device 144 for storing data for users, routes, intersections, lanes, lane groups, maps, location information, etc. In some implementations, as described in reference to FIG. 2, the client device 110 may include position locating capabilities, such as a Global Positioning System (GPS) receiver, Wi-Fi radio, cellular radio, or other device for determining its location.

In some instances, a navigation application 112 acts in part as a thin-client application that may be stored on the client device 110 and in part as components that may be stored on the navigation server 104. For example, the navigation server 104 may store the user data in the storage device 132 and estimate a lane and/or lane-group level route for the user.

In some implementations, the mobile computing system 108 sends and receives data to and from one or more of the navigation server 104, the data server 106, and the client device 110. The mobile computing system 108 is any computing device that includes a memory and a processor. In one implementation, the mobile computing system 108 is may comprise any vehicle or any other mobile system with non-transitory computer electronics (e.g., a processor, a memory or any combination of non-transitory computer electronics). Examples include a car, plane, boat, truck, bionic implant, robot, personal transport device, commercial transport device, etc. In some implementations, the mobile computing system 108 includes a storage device 142 for storing registration data for users, routes, intersections, lanes, lane-groups, maps, etc. In some implementations, as described in reference to FIG. 2, the mobile computing system 108 may include position capabilities, such as a GPS receiver, Wi-Fi radio, cellular radio, or other device for determining its location.

The data server 106 may include a mapping application 116, a real-time traffic module 118, map storage 134, historical roadway traffic data 136, and roadway geometry data 138, for example. In the illustrated implementation, the data server 106 is connected to the network 102 via which it may communicate with other components of the system 100. In some implementations, the mapping application 116 receives a request for a map from the navigation application 112. For example, the navigation application 112 requests a map describing one or more roadways, roadway segments, lanes, lane-groups etc. In some implementations, the mapping application 116 fetches map data describing a map from the map storage 134 and sends the map data to the navigation application 112. In some other implementations, the mapping application 116 generates additional or different information relating to navigation. For example, the information relating to navigation may include, but are not limited to, real-time traffic updates, construction updates, accident information, etc.

The real-time traffic module 118 may include software and routines for aggregating real-time traffic data and, in some instances, serving requests for the real-time traffic data. For instance, the real-time traffic module 118 may collect data from mobile computing systems 108, client devices 110, traffic cameras, traffic sensors, or other real-time data gathering devices and may, for instance, in response to a request by a navigation application 112, provide the real-time data to the navigation application 112. It should be noted that real-time may include certain delays due to latency, processing, transfer time, etc.

In some implementations, the map storage 134 may include map data, such as the locations (e.g., GPS), interconnections, shapes, etc., of roads. The map data may include identifications of roadway segments, roadway junctions, lanes, lane-groups, traffic signal locations, etc.

In some implementations, the historical roadway traffic data 136 may include traffic data that may be time dependent, and/or averaged over time, travelers, or vehicles. The historical roadway traffic data 136 may be gathered by aggregating data from mobile computing systems 108, client devices 110, traffic cameras, or other traffic monitoring devices.

In some implementations, the roadway geometry data 138 may include, for example, data representing the shape, width, length, etc., of roads. For example, the roadway geometry data 138 may include whether and how roads or lanes merge, diverge, meet in an intersection, or curve, etc. In some instances, the roadway geometry data 138 may include identifications of links between roadway segments and lanes and/or lane groups, such as a mapping between of a roadway segment to lanes in that roadway segment.

Figure 2:
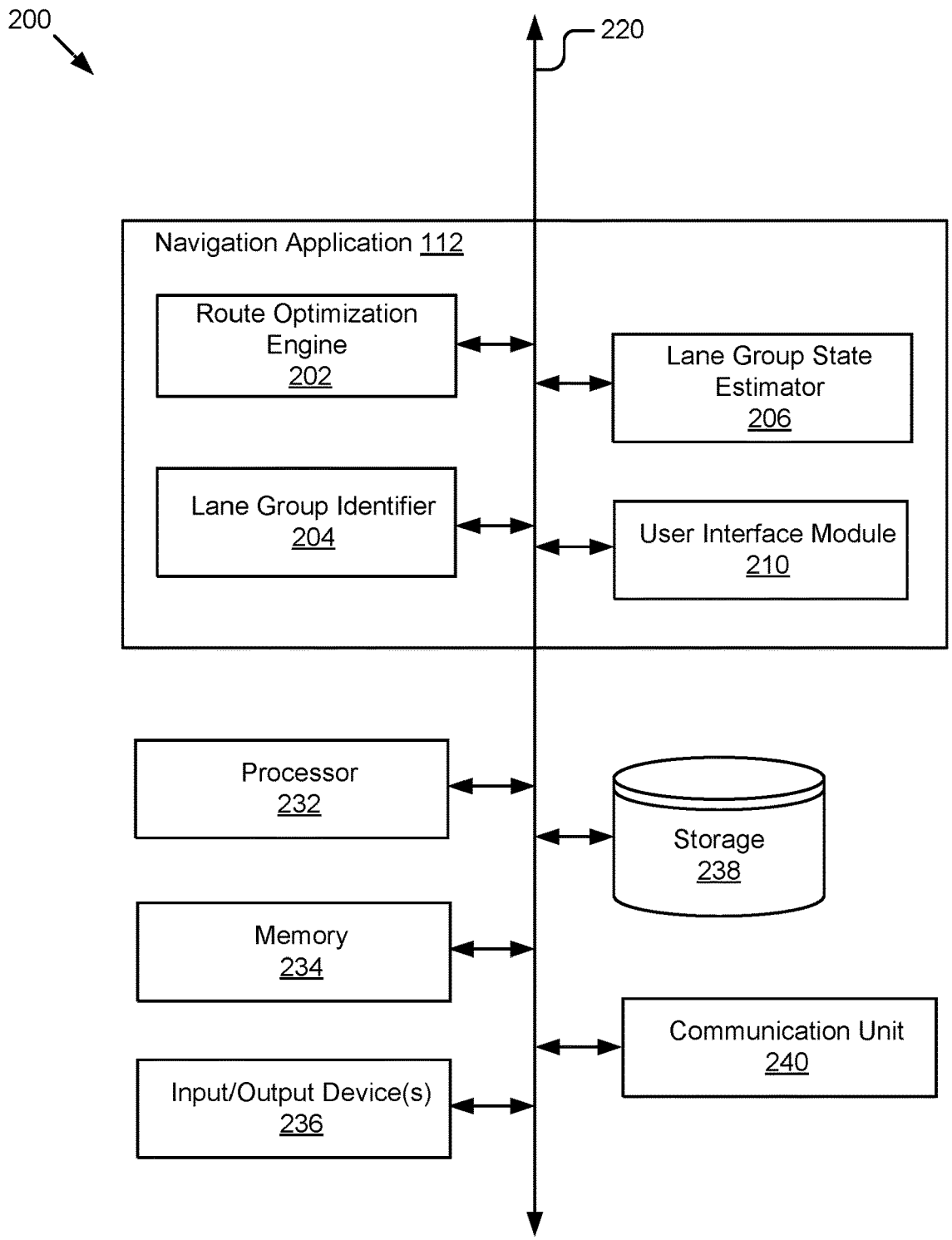
FIG. 2 is a block diagram illustrating an example computing device that includes a navigation application.

Referring now to FIG. 2, an example of the navigation application 112 is shown in more detail. FIG. 2 is a block diagram of a computing device 200 that includes a navigation application 112, a processor 232, a memory 234, input/output device(s) 236, a storage device 238, and a communication unit 240 according to some implementations. The components of the computing device 200 are communicatively coupled by a bus 220. The computing device 200 may represent a navigation server 104, client device 110, or mobile computing system 108 depending on the implementation.

The processor 232 may include an arithmetic logic unit, a microprocessor, a general purpose controller, or some other processor array to perform computations and, in some instances, provide electronic display signals to a display device. The processor 232 is coupled to the bus 220 for communication with the other components. Processor 232 processes data signals and may include various computing architectures including a complex instruction set computer (CISC) architecture, a reduced instruction set computer (RISC) architecture, or an architecture implementing a combination of instruction sets. Although FIG. 2 illustrates a single processor 232, multiple processors 232 may be included. Other processors, operating systems, sensors, displays and physical configurations are possible.

The memory 234 may store instructions and/or data that can be executed by the processor 232. The memory 234 may be coupled to the bus 220 for communication with the other components. The instructions and/or data may include code for performing the techniques described herein. The memory 234 may be a dynamic random access memory (DRAM) device, a static random access memory (SRAM) device, flash memory or some other memory device. In some implementations, the memory 234 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 240 transmits and receives data to and from the navigation application 112. The communication unit 240 may be coupled to the bus 220. In some implementations, the communication unit 240 includes a wireless transceiver for exchanging data with the other components in the computing device 200 or other communication channels using one or more wireless communication methods, including IEEE 802.11, IEEE 802.16, BLUETOOTH® or another suitable wireless communication method.

In some implementations, the communication unit 240 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some implementations, the communication unit 240 includes a wired port and a wireless transceiver. The communication unit 240 also provides other conventional connections to the network 102 for distribution of files and/or media objects using standard network protocols including TCP/IP, HTTP, HTTPS and SMTP, etc.

The storage device 238 can be a non-transitory memory that stores data for providing the functionality described herein. The storage device 238 may be a dynamic random access memory (DRAM) device, a static random access memory (SRAM) device, flash memory or some other memory devices. In some implementations, the storage device 238 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated implementation, the storage device 238 is communicatively coupled to the bus 220. In one implementation, the storage device 238 includes route data, map data, or other data described, for example, in reference to 132, 142, or 144. For example, the storage device 238 may store other data for providing the functionality described herein.

The input/output device(s) 236 are hardware for receiving input and/or providing output. For example, the input/output device(s) 236 may include speakers to produce sound (e.g., audio instructions corresponding to the route), microphones to record sound (e.g., feedback from the user) and other sensors or feedback devices like accelerometers. Optionally, the input/output device(s) 236 may include one or more analog-to-digital or digital-to-analog converters, and/or one or more digital signal processors to facilitate audio processing. These input/output device(s) 236 are coupled to the bus 220 for communication with the processor 232 and the memory 234. Optionally, a microcontroller may be added as part of the input/output device(s) 236 to facilitate power systems control, as well as off-load the main processor 232 from lower-speed lesser-important tasks.

Although not illustrated, the computing device 200 may include one or more devices for determining its location. For instance, the computing device 200 may include a GPS receiver, Wi-Fi radio, cellular radio, or other device capable of or configured to determine the current location of the computing device 200.

In the illustrated implementation shown in FIG. 2, the navigation application 112 may include a route optimization engine 202, lane group identifier 204, lane group state estimator 206, and/or a user interface module 210. In some implementations, the components of the navigation application 112 may be communicatively coupled via the bus 220. In some embodiments, the navigation application 112, the route optimization engine 202, the lane group identifier 204, the lane group state estimator 206, and/or the user interface module 210 may be implemented using software executable by one or more processors of one or more processors and/or computing devices, using hardware, such as but not limited to a field-programmable gate array (FPGA), an application-specific integrated circuit (ASIC), etc., and/or a combination of hardware and software, etc.

The route optimization engine 202 may comprise software and/or hardware logic executable to request map data and route data from the data server 106. In one implementation, the route optimization engine 202 can be a set of instructions executable by the processor 232 to provide the functionality described below for generating or optimizing routes, requesting map data and route data from the data server 106, etc.

In some implementations, the route optimization engine 202 generates a request for a map and sends the request for the map to the data server 106. For example, the route optimization engine 202 may generate a request for a map covering San Jose area in California. The map data can include multiple freeways and intersections in San Jose, historical routes traveled by users, geographic location (e.g., GPS) data describing maps, roadway segments and roadway junctions, lanes, lane groups and other data from the data server 106, for example. The route optimization engine 202 may also or alternatively receive some or all of this information from other components of the navigation application 112 or the system 100.

The lane group identifier 204 may comprise software and/or hardware logic executable to identify groups of lanes, for instance. In some implementations, the lane group identifier 204 may differentiate lane groups as static or temporary. The functionality of the lane group identifier 204 is described in further detail below in reference to FIGS. 3-4B, for example.

The lane group state estimator 206 may comprise software and/or hardware logic executable to predict traffic in a lane and/or lane group, for example, as described in further detail below. For instance, the lane group state estimator 206 may estimate lane-group level traffic based on traffic on a particular group of lanes and data received from the lane group identifier 204.

The lane group state estimator 206 may determine the impact of traffic on the time to pass through a roadway junction or, for instance, the time added to the route at roadway junctions in the route. In some implementations, the lane group state estimator 206 may differentiate the delays at the left turn, through, and right-turn movements in order to account them separately in the estimation of vehicle route travel times and, in some instances, eliminate certain time consuming movements from the route.

The user interface module 210 can may comprise software and/or hardware logic executable to generate a user interface for displaying useful information of a route for a user. In one implementation, the user interface module 210 can be a set of instructions executable by the processor 232 to provide the functionality described below for generating a user interface for displaying useful information of a route for a user. In another implementation, the user interface module 210 can be stored in the memory 234 of the computing device 200 and can be accessible and executable by the processor 232. In either implementation, the user interface module 210 can be adapted for cooperation and communication with the processor 232 and other components of the computing device 200.

In some implementations, the user interface module 210 receives instructions from the route optimization engine 202 to generate a user interface for displaying information regarding calculated routes, travel times, estimated times of arrival, etc. The information may also include attractions and amenities along a route. In another example, the information also includes traffic delay information and road closure information associated with the route or some of the lanes in the route. In some implementations, the user interface module 210 transmits the user interface data including the useful information to a client device 110 or a mobile computing system 108, causing the client device 110 or the mobile computing system 108 to display the user interface including useful information to the user.

Figure 3:
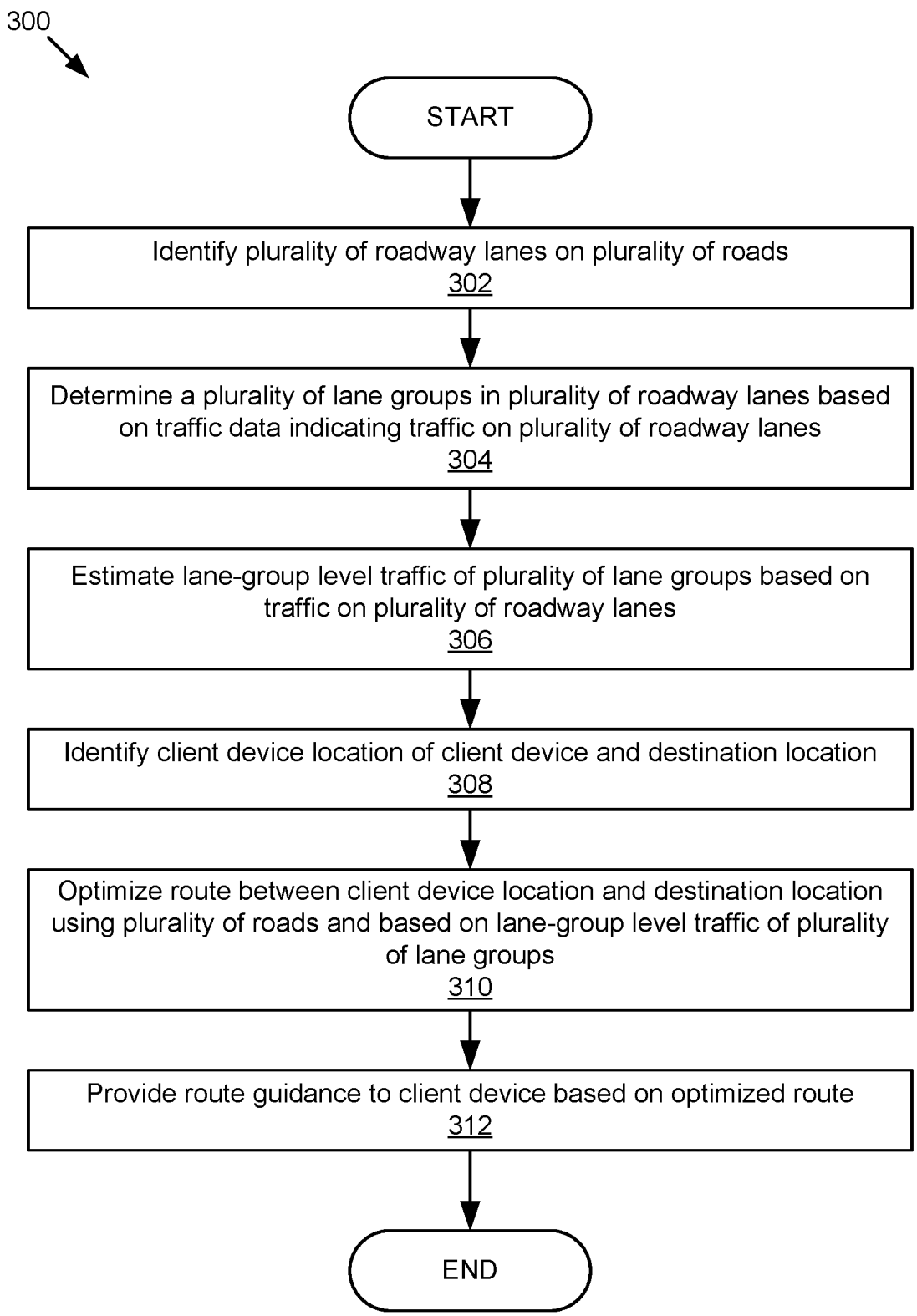
FIG. 3 is a flow diagram of an example method for generating navigation routes using lane group identification.

FIG. 3 is a flow diagram of an implementation of a method 300 for generating navigation routes using lane group identification. For instance, the system 100 may determine lane groups, which may be used, along with lane-group level traffic data to optimize routes between an origin location and a destination location.

At 302, the navigation application 112 may identify a plurality of roadway lanes on one or a plurality of roads. In some implementations, the navigation application 112 may retrieve map data including road attributes for roads in a roadway network from the data server 106 and may determine lanes corresponding to each road based on the road attributes. In some instances, the attributes may include a mapping of lanes to roadway segments. In some instances, the navigation application 112 may use geometry data, traffic information, vehicle location and telemetry data, etc., to dynamically identify lanes on roads in the map.

At 304, the navigation application 112 may determine a plurality of lane groups in the plurality of roadway lanes based on traffic data indicating traffic on plurality of roadway lanes. For instance, the navigation application 112 may determine lane groups based on road geometries, historical lane-level average speed or real-time lane level average speed of vehicles on a road, or other factors. In some instances, the plurality of lane groups may include static lane groups or temporary lane groups. Example operations for determining lane groups are described in further detail in reference to 406 and 414 in FIG. 4A.

At 306, the navigation application 112 may estimate lane-group level traffic of the plurality of lane groups based on traffic on the plurality of roadway lanes. In some implementations, estimating the lane-group level traffic includes estimating a current travel time of vehicles in a particular lane (e.g., between two points on a road, such as intersections) using a real-time lane-level average speed and a length of a roadway (e.g., between two points or intersections on the road). The lane-group level traffic may be represented in or include the current lane-level travel time. Example operations for estimating the lane-group level traffic are described in further detail in reference to 416 in FIG. 4B.

At 308, the navigation application 112 may identify a client device location of a client device 110 (or another origin location input, for instance, into the user interface module 210) and a destination location. For example, the navigation application 112 may receive the location of the client device 110 based on GPS, cellular network triangulation, etc. Similarly, the navigation application 112 may receive the destination location as input from a user, depending on the implementation. It should be noted that, although the client device 110 is referred to in reference to FIGS. 3-4B, the mobile computing system 108 may also or alternatively be used.

At 310, the navigation application 112 may optimize a route between the client device location and the destination location via plurality of roads and based on the lane-group level traffic of plurality of lane groups, for instance, as estimated in 306. In some implementations, optimizing the route includes combining lane groups (e.g., end to end or otherwise coupled by intersections) together to form a path between a first and second location.

In some implementations, the optimized route may include a lane-level or lane-group level routing indicating which lanes or groups of lanes a vehicle navigating through the route should use in order to reduce the total travel time through the road. For instance, the lane-level routing (e.g., a routing of which lanes or groups of lanes to use during navigation) may be generated based on real-time and predicted lane-group travel time.

In some implementations, the navigation application 112 may determine a set of routes between the location of the client device and the destination location using one or more of map data, lane-level or lane-group level travel times, or other data. For instance, the navigation application 112 may select among lane groups to connect the location of the client device 110 and the destination location and may, for example, select a route(s) with the shortest distances and or shortest total travel times.

In some implementations, the navigation application 112 may determine route guidance data, such as turn by turn directions, for a particular route selected from the set of routes using the total travel time. In some implementations, the navigation application 112 may provide an interface to a user to indicate potential routes including, in some instances, which lanes to use, and their total travel times or estimated times of arrival. The navigation application 112 may receive input from the user selecting a particular route.

In some implementations, the navigation application 112 may select the particular route (e.g., which may be lane level or lane-group level) from the set of routes based on a total travel time and a stored user preference for certain route features. For instance, the navigation application 112 may automatically select a particular route or rank the set of routes based on the total travel time and/or a user preference. For example, the navigation application 112 may determine that a user has a preference (e.g., explicitly provided by the user or learned by the navigation application 112 from previous user interactions) to take a route with the shortest total travel time, in which circumstance the navigation application 112 may automatically select the route and lanes with the shortest total travel time. In some implementations, the user preference may indicate other conditions, for example, such as a preference for avoiding toll roads, in which circumstance, the navigation application 112 may automatically exclude out routes with toll roads (or not calculate routes using toll roads at all).

Figure 4A:
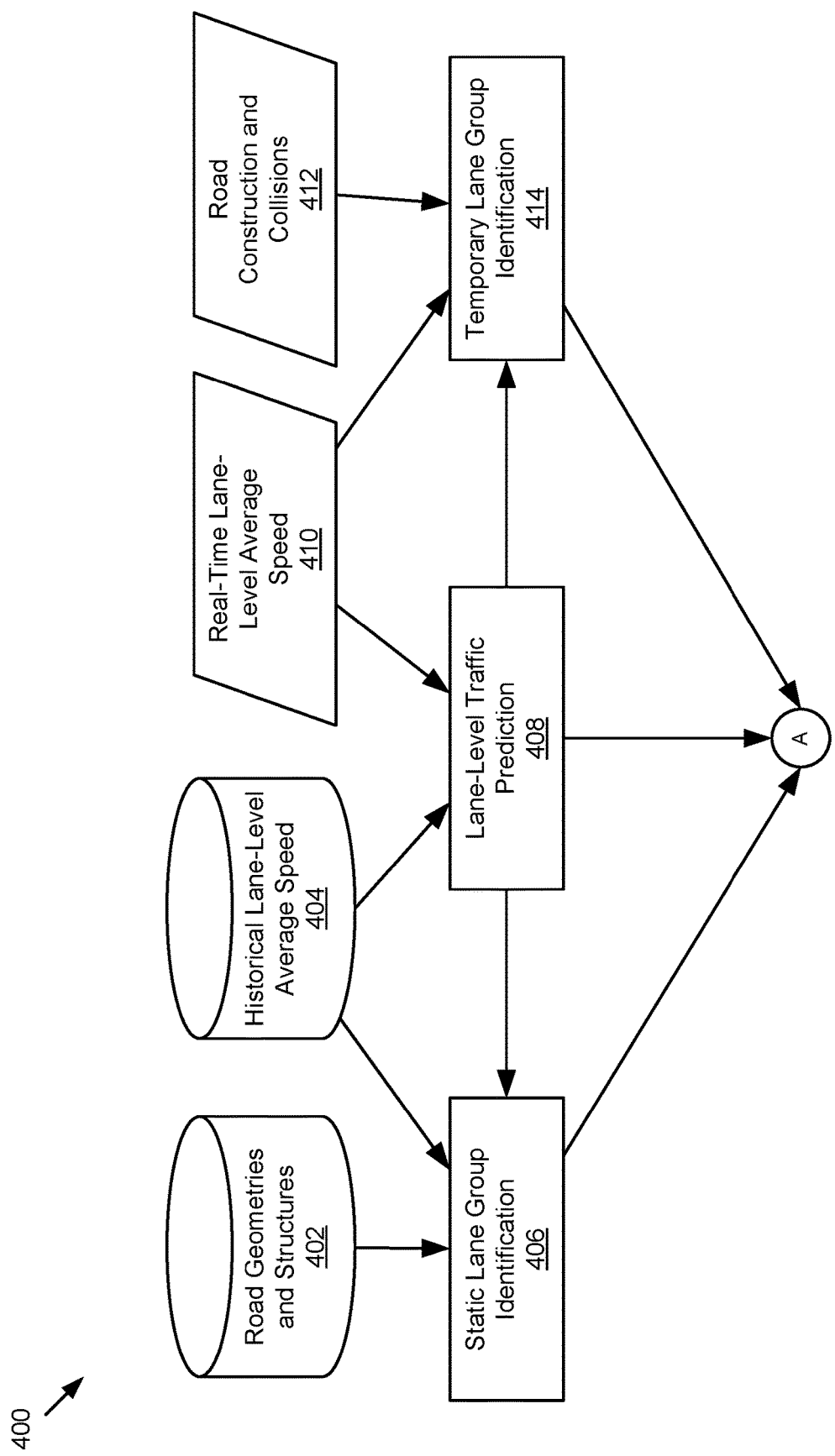
FIG. 4A is a flow diagram of an example method for determining lane groups.
Figure 4B:
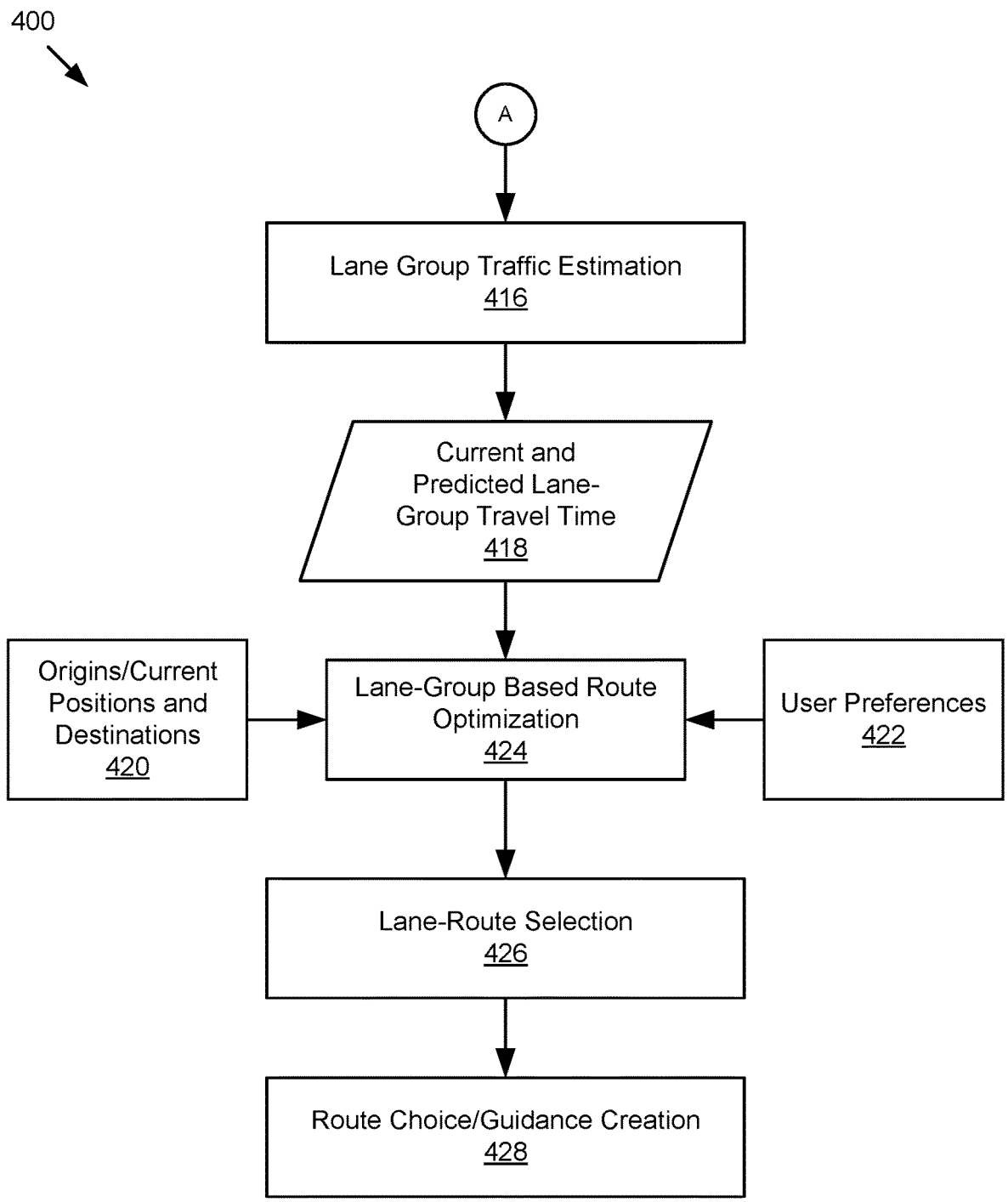
FIG. 4B is a flow diagram of an example method for estimating lane-group traffic and optimizing a route based on the lane-group level traffic.

Example operations for optimizing the route are described elsewhere herein, such as in reference to 420-428 in FIG. 4B.

At 312, the navigation application 112 may provide route guidance to the client device 110 based on the optimized route. In some implementation, the route guidance may include point by point directions provided in real-time to the client device 110 during travel. In some instances, the directions may indicate at determined points on a roadway at which to change lanes and into which lanes to change based on the techniques described herein.

In some implementations, the navigation application 112 may recalculate the route and/or travel times during route guidance. For instance, providing the route guidance for the particular route to the client device based on the route guidance data may include periodically modifying the particular route based on a second location of the client device during transit of the particular route by the client device. For example, based on a driver or system specified frequency, the navigation application 112 may determine a current client device 110, recalculate the travel times, and recalculate routes and/or lanes during transit.

FIG. 4A is a flow diagram of an example method 400 including determining lane groups. In some implementations, the lane group identification involves two parts: static lane groups and temporary lane groups.

At 402, the lane group identifier 204 may receive road geometries and structures (e.g., from the roadway geometry data 138 on the data server 106) and at 404, the lane group identifier 204 may receive historical lane-level average speed (e.g., from the historical roadway traffic 136 on the data server 106). In some implementations, the lane group identifier 204 may also receive and or generate lane-level traffic predictions, as described below. It should be noted that, although not shown in FIG. 4A, for the purposes of static lane group identification, real-time lane-level average speed and road construction and collision data received at 410 and 412 respectively may be also or alternatively be used.

At 406, the lane group identifier 204 may identify static lane groups. For example, determining the plurality of lane groups in the plurality of roadway lanes may include determining the one or more static lane groups in the plurality of roadway lanes based on a lane-level average speed among adjacent lanes of the plurality of roadway lanes. For instance, because the average speed of vehicles in the static lanes may be different from the other lanes on a road.

In some implementations, static lane groups may be defined as the lane groups with instantaneous differences of traffic states on roads. Static lanes may be determined by road geometries and network structures. For example, in instances where the road includes a freeway, the static lanes may be high-occupancy vehicle (HOV), high-occupancy toll (HOT), general-purpose lanes, truck lanes, or other lanes that consistently have different traffic or travel times than ordinary lanes. In some instances, static lanes may be separated by different types of vehicles, and traffic conditions on these lanes may be different than ordinary lanes. In the example of non-freeway or arterial roads, static lanes may be left-turn, through, right-turn lanes, or other lanes that contain vehicles with different movements than the majority of traffic. For instance, the lane group identifier 204 may identify static lanes because their average speed, volumes, queue lengths are may be different from other lanes on the same or similar roads.

Additionally or alternatively, static lanes may be determined based on road geometries and structures, historical lane-level traffic conditions, such as lane-level average speed, etc., where the traffic conditions at one or multiple lanes are constantly different from the other lanes on a road. For example, the one or two right-most lanes on freeways which are connecting to on- and/or off-ramps may have very long queues during peak hours, while the other mainline lanes may have free-flow traffic. The historical data can identify the different traffic states in these lanes and define the lane groups. The temporary lane groups are defined as the lanes with different real-time and predicted lane-level average speed. If the average speed on one or multiple lanes are very different from other lanes, they may be defined as different lane groups. It should be noted that this definition is not permanent for the same road, instead it may change over time based on lane-level traffic conditions. In addition, roadside constructions and vehicle incidents may cause lanes to be blocked thereby resulting in slower traffic on the neighboring lanes. These impacts may redefine lane groups.

At 410 and 412, the lane group identifier 204 may receive real-time lane level average speed and road construction and collision data, respectively. It should be noted that, although not shown in FIG. 4A, for the purposes of temporary lane group identification, road geometries and structures and historical lane-level average speed received at 402 and 404 respectively may be also or alternatively be used.

At 414, the lane group identifier 204 may identify temporary lane groups. In some implementations, temporary indicates those lanes that are not static lanes. In some implementations, temporary lane groups are identified for a given time period or until the traffic or other conditions in those lanes changes (thereby changing the threshold level of similarity among lanes in a given lane-group, so that those lanes would no longer be classified as being in the same group).

In some implementations, determining the plurality of lane groups in a plurality of roadway lanes may include determining the one or more temporary lane groups in the plurality of roadway lanes based on a variation in lane-level traffic conditions and a lane-level average speed among adjacent lanes of the plurality of roadway lanes.

For example, identifying temporary lane groups may include determining a similarity of real-time lane-level average speed for adjacent lanes and classifying those lanes as belonging to the same group (e.g., based on a threshold level of similarity). In some implementations, temporary lane groups may be identified additionally or alternatively based on a road condition, such as construction or a collision. For instance, if the left two lanes of a road are closed due to construction, the traffic in those lanes would likely be similar to each other may therefore be classified as in the same temporary lane group.

At 408, the lane group state estimator 206 (or lane group identifier 204, depending on the implementation) may determine lane-level traffic predictions for the lanes. The lane group state estimator 206 may receive historical lane-level average speed and real-time lane-level average speed. In some instances, the lane group state estimator 206 may use the one of both of the historical and real-time speeds in the lane to evaluate how much traffic is in a lane. For instance, if the real-time speed is lower than the historical speed, the lane group state estimator 206 may determine that the traffic level is high. In some implementations, the lane group state estimator 206 may compare the real-time speed with a known speed limit for the lane to determine traffic in the lane. In some implementations, the lane-level traffic may include a lane-level travel time determined, for example, by applying one or both of the historical and real-time average lane-level speed to a length of the lane (e.g., between roadway junctions/intersections, two arbitrary points, a static length, etc.).

In some implementations, estimating a lane or lane-group level traffic of the plurality of lane groups may include estimating a current lane-level travel time of the plurality of roadway lanes using a real-time lane-level average speed and a length of a roadway.

In some implementations, the lane group state estimator 206 may predict a future lane-level traffic based on the historical lane-level average speed at a given time, which may be adjusted based one whether the real-time lane-level average speed is high or low. For instance, a lower real-time lane-level average speed than is normal (e.g., based on the historical speed for that lane and time of day, for instance, indicating traffic jam) may impact a prediction of the future traffic/speed in that lane, so that the predicted future lane-level speed is also lower than normal.

In some implementations, the lane-group state estimator 206 may estimate a lane-group level traffic by applying historical lane-level traffic information to a machine learning algorithm to generate a predictive model, and then inputting the real-time lane-level travel time as an initial state in the predictive model to determine the predicated lane-level travel time For example, to achieve the lane and/or lane group state (e.g., speed and/or traffic) estimation, the lane-group state estimator 206 may utilize real-time lane-level average speed to estimate current lane-level travel time based on the roadway segment length. In parallel (although other implementations than parallel are possible), the lane-group state estimator 206 may communicate with a database (e.g., 132, 134, 142, or 144) to store the historical lane-level average speed information. The historical information may be applied to classify traffic patterns with machine learning algorithms (e.g., artificial neural networks) or to calibrate statistical time-series regression prediction models. The real-time lane-level travel time may then be introduced as an initial state of a trained (e.g., using historical traffic data) machine learning algorithm or the regression model to predict the future lane-level traffic conditions. In some instances, the future lane-level traffic conditions may include average speed and volumes. Subsequently, for instance, as described in reference to 418 below, the lane-level information may be generalized to a lane-group.

FIG. 4B is a flow diagram of an example method 400 including estimating lane-group traffic and optimizing a route based on the lane-group level traffic.

At 416, the lane group state estimator 206 may estimate lane group traffic for a lane group by combining lane-level information in a particular lane group of the plurality of lane groups to determine the lane-group level traffic. For instance, lane-level information in the same lane group may be summarized, averaged, or otherwise combined to estimate a lane group traffic state, such as an estimated current and/or predicted lane-group travel time.

At 418, the lane group state estimator 206 (or the route optimization engine 202, depending on the implementation) may determine a current and/or predicted lane-group travel time. For instance, the lane group state estimator 206 may use the estimated lane-group traffic (e.g., which may include an average speed in the lane-group, as described above) and apply it to a length of the lane-group. For instance, a length of the lane-group may a given unit (e.g., one mile), a distance between two points (e.g., intersections, freeway on-ramps or off-ramps, etc.), or a distance of the road that the vehicle may travel on according to a calculated route, depending on the implementation.

At 420, the route optimization engine 202 may receive one or more locations for determining a route. For instance, the route optimization engine 202 may receive an origin location and a destination location. In some implementations, the origin location may be a current geographical location of a client device 110, for example, as described above.

At 422, the route optimization engine 202 may receive one or more user preferences indicating preferences associated with a particular user (e.g., whether explicitly entered by the user or learned by past interaction of the user with the route optimization engine 202). For instance, as described in reference to FIG. 3 above, the route optimization engine 202 may customize a route or set of routes to the user preferences.

At 424, the route optimization engine 202 may generate and/or optimize a route based on the lane-group travel times determined above. For instance, optimizing the route between the client device 110 location and the destination location includes determining the route between the client device 110 location and the destination location by combining at least two of the plurality of lane groups to create a path between the client device location and the destination location.

In some implementations, the route optimization engine 202 may replace roadway segments in conventional route calculation technologies with segments (e.g., distances of road) of lane-groups to select a particular (e.g., the shortest in time or distance) path or route between the client device 110 location and the destination location.

The optimized route may include a lane-level routing indicating a use of which lanes reduces total travel time of the route. Optimizing the route between the client device 110 location and the destination location may include generating the lane-level routing based on real-time group travel time and/or a predicted group travel time. For example, the route optimization engine 202 may determine the lane to be chosen in each lane group along the lane-group based routes to minimize the number of lane changes during the trip so as to minimize the impact of lane changes to the entire network and to reduce potential risk of incidents.

At 426, the route optimization engine 202 may receive (e.g., by way of the user interface module 210 a selected route. In some implementations, the optimal routes and lane routes may be selected based on the lane groups' real-time and predicted travel time, the origin and destination locations, and user preferences. For instance, the user interface module 210 may output information pertaining one or more optimized routes to the user and may receive a selection of a route. In other instances, the route optimization engine 202 may automatically select a route based on the user preferences.

At 428, route optimization engine 202 may create route guidance based on the selected route. In some implementations, the selected route may finally guide a vehicle (e.g., by providing instructions to a user or to an automated vehicle system) to reach its destination with minimum travel time, and based on the predicted lane group information.

It should be noted that, in some implementations, as discussed above, the route optimization engine 202 may update the origins of an individual vehicle with its current position to re-calculate their optimal routes during route guidance.

Figure 5A:
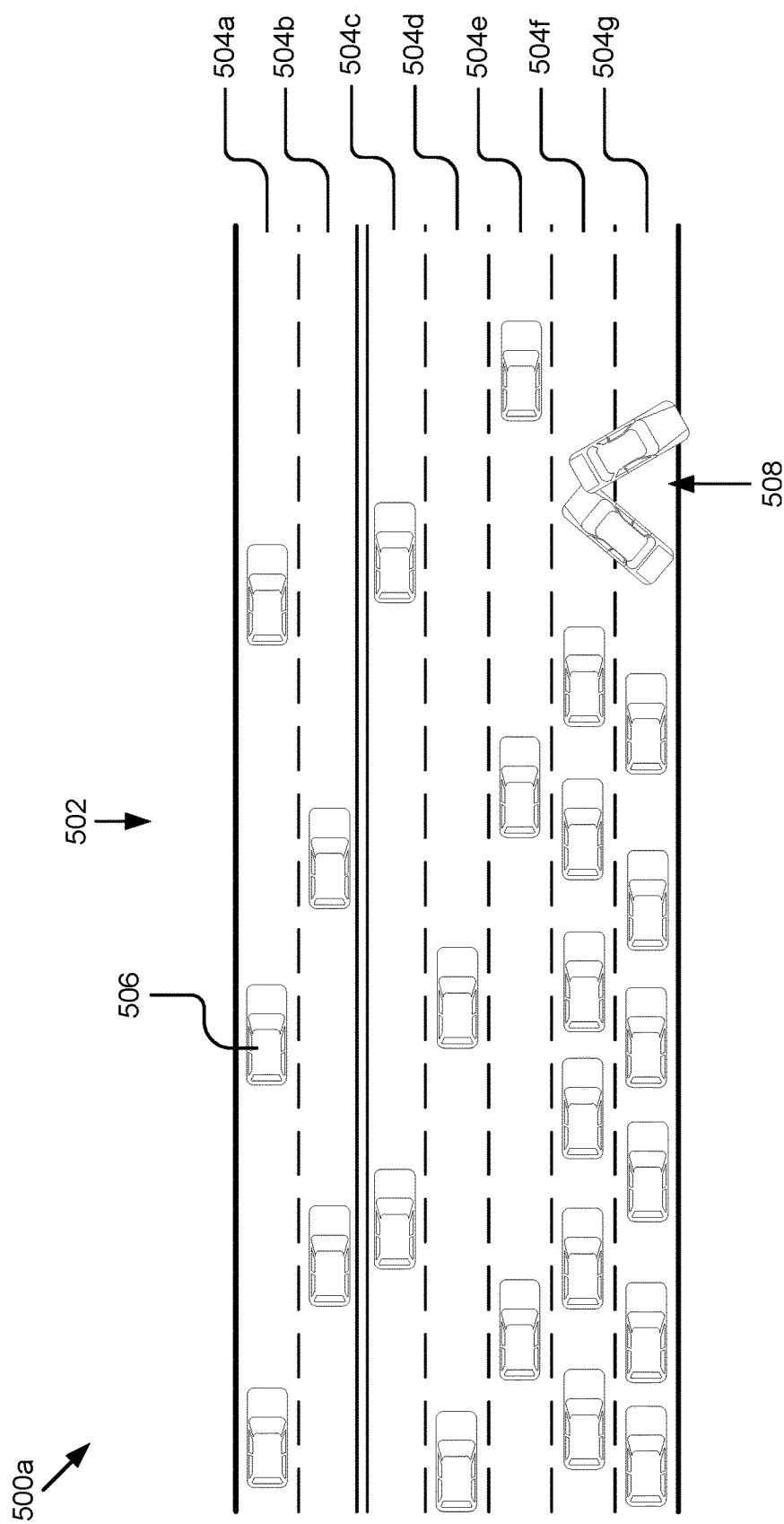
FIGS. 5A and 5B are illustrations of example roadways with lane groups.

FIG. 5A illustrates a diagram 500a of example roadway 502 (e.g., a portion of a freeway). As illustrated, the roadway includes a plurality of lanes 504a-504g and a plurality of vehicles 506 traveling down the roadway.

In the example diagram 500a, the lanes 504a and 504b may represent HOV lanes and may therefore be classified as static lanes using the navigation application 112 described herein. Further, as illustrated, the traffic level of the two HOV lanes 504a and 504b is similar, so they may be grouped into a first lane group.

The lanes 504f and 504g are not static lanes, but include an obstruction, so the navigation application 112, using the techniques described herein may classify them as temporary lanes and may, based on their similar traffic pattern, group them into a second lane group.

The lanes 504c, 504d, and 504e also have similar levels of traffic, so the navigation system 112 may group them into a third lane group for the purposes of the methods described herein.

Accordingly, using the technology described herein, the navigation application 112 may generate a route including guidance indicating to use any of the lanes in the third lane group (e.g., 504c, 504d, and 504e), for example. However, the navigation application 112 may typically not instruct a vehicle to change lanes within a lane group because it would only lead to unnecessary lane changes without an improvement in average speed of the vehicle.

Figure 5B:
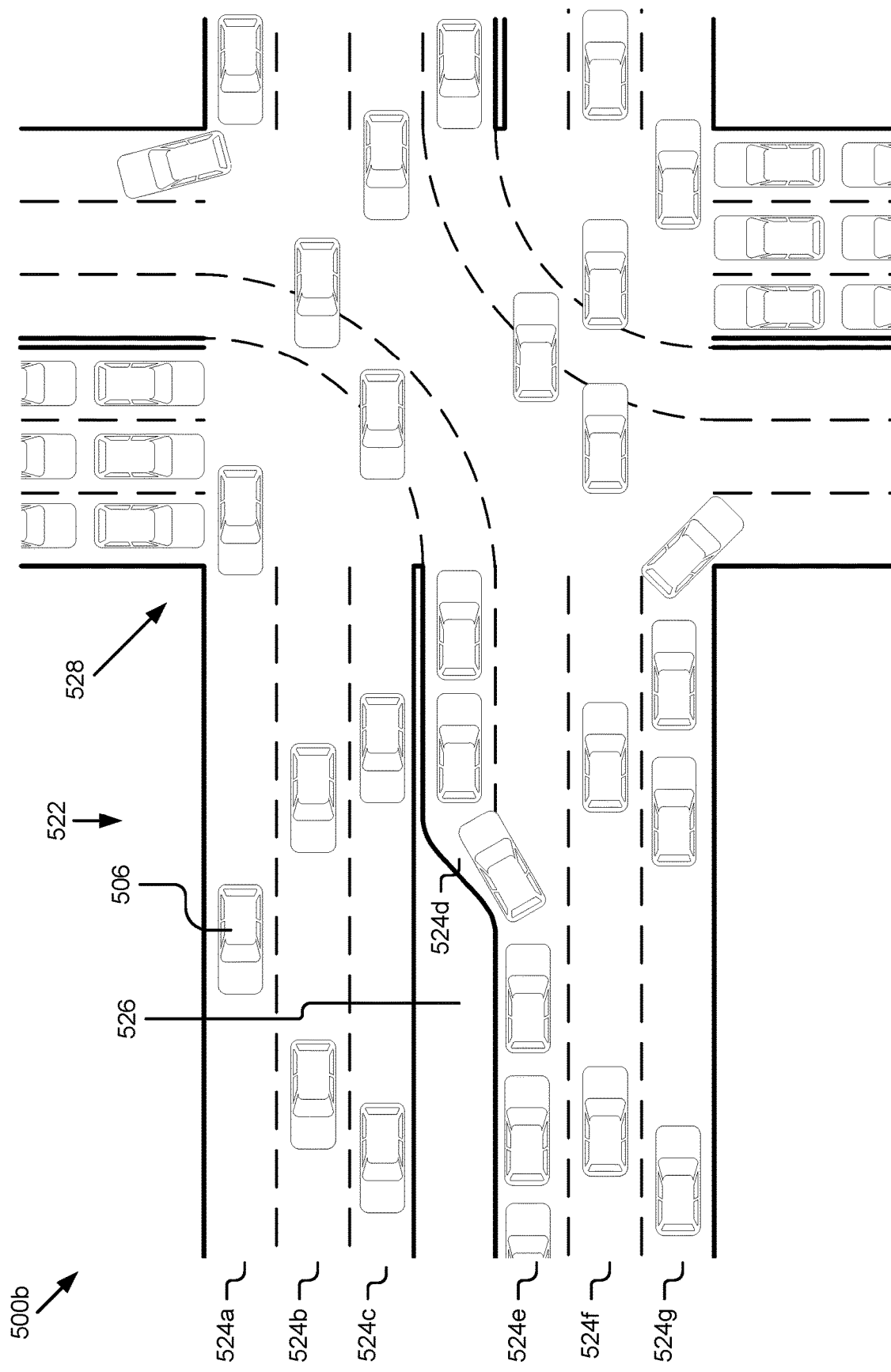

FIG. 5B illustrates a diagram 500b of example a portion of a roadway 522 with an intersection 528. As illustrated, the roadway 522 includes a plurality of lanes 524a-524g and a plurality of vehicles 506 traveling on the roadway 522.

In the example diagram 500b, the lanes 524a, 524b, 524c may be classified as static lanes using the navigation application 112, because their traffic may be relatively consistent. Further, as illustrated, the traffic level of the lanes 524a, 524b, and 524c may be similar, so they may be grouped into a first lane group after (e.g., to the left of) the intersection 528.

The navigation application 112 may determine that the lane 524f is static because it has a consistent traffic pattern throughout the day, or it may be considered to be temporary, depending on the situation, as described elsewhere herein. In the example depicted in FIG. 5B, the lane 524f may have different traffic (e.g., than 524e and 524g), so it may be placed alone in a group by the navigation application 112.

The lane 524e may be considered by the navigation application 112 to be a temporary lane, because the traffic pattern may change substantially over time. For instance, due to the island 526, the traffic in turning lane 524d may back up into the flow of traffic in lane 524e when there are a large number of vehicles turning left in the lane 524d. At other times, when there are fewer cars turning left in the turning lane 524d, the lane 524e may flow freely (and may, in some instances be grouped with the lane 524f, for example).

The traffic in lane 524g may be considered to be a temporary lane, depending on its attributes, as described elsewhere herein. In some instances, due to the cars turning right at the intersection 528, the flow of traffic in the lane 524g may be slower than that of 524f and may, accordingly, be considered to be a separate lane group from either 514e or 524f, depending on the traffic pattern, for example as described above.

Accordingly, using the technology described herein, the navigation application 112 may generate a route including guidance indicating which of the lanes or lane groups to use before and after the intersection 528.

In the forgoing description, for purposes of explanation, numerous specific details are set forth in order to provide a thorough understanding of the invention. It will be apparent, however, to one skilled in the art that the implementations can be practiced without these specific details. In other instances, structures and devices are shown in block diagram form in order to avoid obscuring the invention. For example, the invention is described in some implementations with reference to client devices and particular software and hardware. However, the description applies to any type of computing device that can receive data and commands, and any peripheral devices providing services.

Reference in the specification to "one implementation" or "an implementation" means that a particular feature, structure, or characteristic described in connection with the implementation is included in at least one implementation. The appearances of the phrase "in one implementation" in various places in the specification are not necessarily all referring to the same implementation.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some implementations can take the form of a hardware implementation, a software implementation or an implementation containing both hardware and software elements. An implementation may be implemented in software, which includes but is not limited to firmware, resident software, microcode, etc.

Furthermore, some implementations can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code is retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various implementations as described herein.

The foregoing description of the implementations has been presented for the purposes of illustration and description. It is not intended to be exhaustive or to limit the specification to the precise form disclosed. Many modifications and variations are possible in light of the above teaching. It is intended that the scope of the implementations be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   identifying, by a processor, a plurality of roadway lanes on a plurality of roads;
   determining a lane-level average speed of each roadway lane of the plurality of roadway lanes;
   determining a level of similarity among the lane-level average speed for two or more roadway lanes of the plurality of roadway lanes;
   classifying the plurality of roadway lanes into two or more lane groups based on a threshold level of similarity of the lane-level average speed among the plurality of roadway lanes, at least one of the two or more lane groups including at least two roadway lanes, the two or more lane groups in the plurality of roadway lanes including one or more static lane groups and one or more temporary lane groups;

determining the one or more temporary lane groups in the plurality of roadway lanes based on a variation in lane-level average speeds among adjacent lanes of the plurality of roadway lanes, the one or more temporary lane groups including different roadway lanes of the plurality of roadway lanes than the one or more static lane groups;

estimating, by the processor, lane-group level traffic of the two or more lane groups based on traffic on the plurality of roadway lanes;

identifying, by the processor, a client device location of a client device and a destination location;

optimizing, by the processor, a route between the client device location and the destination location using the plurality of roads and based on the lane-group level traffic of the two or more lane groups; and providing, by the processor, route guidance to the client device based on the optimized route.

2. The computer-implemented method of claim 1, further comprising determining the one or more static lane groups in the plurality of roadway lanes based on road geometries of the plurality of roadway lanes.

3. The computer-implemented method of claim 1, wherein estimating the lane-group level traffic of the two or more lane groups includes estimating a current lane-level travel time of the plurality of roadway lanes using a real-time lane-level average speed and a length of a roadway, the lane-group level traffic being based on the current lane-level travel time.

4. The computer-implemented method of claim 3, wherein estimating the lane-group level traffic of the two or more lane groups includes combining lane-level information in a particular lane group of the two or more lane groups to determine the lane-group level traffic, the lane-level information including the current lane-level travel time and a predicted lane-level travel time.

5. The computer-implemented method of claim 4, wherein estimating the lane-group level traffic of the two or more lane groups includes:

applying, by the processor, historical lane-level traffic information to a machine learning algorithm to generate a predictive model, and inputting, by the processor, the current lane-level travel time as an initial state in the predictive model to determine the predicted lane-level travel time.

6. The computer-implemented method of claim 1, wherein optimizing the route between the client device location and the destination location includes determining the route between the client device location and the destination location by combining at least two of the two or more lane groups to create a path between the client device location and the destination location.

7. The computer-implemented method of claim 6, wherein the optimized route includes a lane-level routing indicating a use of which lanes reduces total travel time of the route.

8. The computer-implemented method of claim 7, wherein optimizing the route between the client device location and the destination location includes generating the lane-level routing based on real-time group travel time and a predicted group travel time.

9. A system comprising:
a processor;
a non-transitory storage device; and
a navigation application executable to:
    identify a plurality of roadway lanes on a plurality of roads;
    determining lane-level average speeds of the plurality of roadway lanes;
    determining a level of similarity of the lane-level average speeds among the plurality of roadway lanes;
    classifying the plurality of roadway lanes into two or more lane groups based on a threshold level of similarity of the lane-level average speeds among the plurality of roadway lanes, at least one of the two or more lane groups including two or more roadway lanes, the two or more lane groups in the plurality of roadway lanes including one or more static lane groups and one or more temporary lane groups;
    determine the one or more temporary lane groups in the plurality of roadway lanes based on a variation in the lane-level average speeds among adjacent lanes of the plurality of roadway lanes, the one or more temporary lane groups including different roadway lanes of the plurality of roadway lanes than the one or more static lane groups;
    estimate lane-group level traffic of the two or more lane groups based on traffic on the plurality of roadway lanes;
    identify a client device location of a client device and a destination location;
    optimize a route between the client device location and the destination location using the plurality of roads and based on the lane-group level traffic of the two or more lane groups; and
    provide route guidance to the client device based on the optimized route.

10. The system of claim 9, wherein the navigation application is further executable to determine the one or more static lane groups in the plurality of roadway lanes based on a lane-level average speed among the adjacent lanes of the plurality of roadway lanes.

11. The system of claim 9, wherein estimating the lane-group level traffic of the two or more lane groups includes estimating a current lane-level travel time of the plurality of roadway lanes using a real-time lane-level average speed and a length of a roadway, the lane-group level traffic being based on the current lane-level travel time.

12. The system of claim 11, wherein estimating the lane-group level traffic of the two or more lane groups includes combining lane-level information in a particular lane group of the two or more lane groups to determine the lane-group level traffic, the lane-level information including the current lane-level travel time and a predicted lane-level travel time.

13. The system of claim 12, wherein estimating the lane-group level traffic of the two or more lane groups includes:

applying historical lane-level traffic information to a machine learning algorithm to generate a predictive model, and inputting the current lane-level travel time as an initial state in the predictive model to determine the predicted lane-level travel time.

14. The system of claim 9, wherein optimizing the route between the client device location and the destination location includes determining the route between the client device location and the destination location by combining at least two of the two or more lane groups to create a path between the client device location and the destination location.

15. The system of claim 14, wherein the optimized route includes a lane-level routing indicating a use of which lanes reduces total travel time of the route.

16. The system of claim 15, wherein optimizing the route between the client device location and the destination location includes generating the lane-level routing based on real-time group travel time and a predicted group travel time.

* * * * *